(12) United States Patent
Kim et al.

(10) Patent No.: US 8,182,965 B2
(45) Date of Patent: May 22, 2012

(54) OPTIMIZED CELL CONFIGURATIONS FOR STABLE LSCF-BASED SOLID OXIDE FUEL CELLS

(75) Inventors: Jin Yong Kim, Richland, WA (US); Vincent L. Sprenkle, Richland, WA (US); Nathan L. Canfield, Richland, WA (US); Kerry D. Meinhardt, Kennewick, WA (US); Lawrence A. Chick, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 828 days.

(21) Appl. No.: 12/241,277

(22) Filed: Sep. 30, 2008

(65) Prior Publication Data

US 2010/0081035 A1    Apr. 1, 2010

(51) Int. Cl.
*H01M 4/02* (2006.01)
*H01M 4/36* (2006.01)
*H01M 4/62* (2006.01)
*H01M 4/90* (2006.01)

(52) U.S. Cl. ........ 429/529; 429/489; 429/523; 429/528; 429/532; 429/533

(58) Field of Classification Search .................. 429/489, 429/523, 528, 529, 532, 533
See application file for complete search history.

(56) References Cited

U.S. PATENT DOCUMENTS

| | | | |
|---|---|---|---|
| 6,235,187 B1 | 5/2001 | Anderson et al. | |
| 6,383,350 B1 | 5/2002 | Sehlin et al. | |
| 6,913,850 B2 | 7/2005 | Sehlin et al. | |
| 7,244,526 B1 | 7/2007 | Meinhardt et al. | |
| 7,351,491 B2 | 4/2008 | Sprenkle et al. | |
| 7,455,700 B2 | 11/2008 | Meinhardt et al. | |
| 2004/0229031 A1* | 11/2004 | Gell et al. | 428/323 |
| 2005/0221138 A1* | 10/2005 | Chinchure et al. | 429/32 |
| 2008/0032172 A1 | 2/2008 | Mukerjee et al. | |
| 2008/0131750 A1 | 6/2008 | Striker et al. | |
| 2009/0148743 A1* | 6/2009 | Day et al. | 429/33 |
| 2010/0055533 A1* | 3/2010 | Kebbede et al. | 429/33 |

FOREIGN PATENT DOCUMENTS

| | | |
|---|---|---|
| EP | WO2004047207 A2 | 6/2004 |
| EP | WO2005017226 A1 | 2/2005 |

OTHER PUBLICATIONS

Tsai et al., Increased solid-oxide fuel cell power density using interfacial ceria layers, 1997, Solid State Ionics, 98, 191-196.*
International Search Report/Written Opinion, WIPO, Mar. 12, 2009.
Liu, Y-Y et al., Fabrication of Electrochemical Ceramic Membrand with Assistance of Metallization by the Electroless-plating Technique, Materials Research Society Symposium Proceedings, vol. 752, 2003, pp. AA8.1.1-AA8.1.6.

* cited by examiner

*Primary Examiner* — Basia Ridley
*Assistant Examiner* — Sean P Cullen
(74) *Attorney, Agent, or Firm* — Derek H. Maughan; A. J. Gokcek

(57) ABSTRACT

Lanthanum strontium cobalt iron oxides ($La_{(1-x)}Sr_xCo_yFe_{1-y}O_{3-f}$; (LSCF) have excellent power density (>500 mW/cm2 at 750° C.). When covered with a metallization layer, LSCF cathodes have demonstrated increased durability and stability. Other modifications, such as the thickening of the cathode, the preparation of the device by utilizing a firing temperature in a designated range, and the use of a pore former paste having designated characteristics and combinations of these features provide a device with enhanced capabilities.

14 Claims, 4 Drawing Sheets

OPTIMIZED CELL CONFIGURATIONS FOR STABLE LSCF-BASED SOLID OXIDE FUEL CELLS

STATEMENT AS TO RIGHTS TO INVENTIONS MADE UNDER FEDERALLY-SPONSORED RESEARCH AND DEVELOPMENT

This invention was made with Government support under Contract DE-FC2602NT41246 awarded by the U.S. Department of Energy. The Government has certain rights in the invention.

BACKGROUND OF THE INVENTION

Lanthanum strontium cobalt iron oxides (La(1-x)Srx-CoyFe1-yO3-fÔ; LSCF) have excellent power density (>500 mW/cm2 at 750° C.). However, the use of these materials in solid oxide fuel cell (SOFC) applications has been hindered because of various problems associated with the degradation in power with time. What is needed therefore is a cell configuration that enables the use of these materials while minimizing the degradation typically associated with the use of such materials. The present invention meets these needs.

Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

SUMMARY OF THE INVENTION

The present invention is a cathode made from a high power SOFC cathode materials possessing thermal expansion mismatch with a adjacent material. Lanthanum strontium cobalt iron oxides (La(1-x)SrxCoyFe1-yO3-fÔ; LSCF) have excellent power density (>500 mW/cm2 at 750° C.). The biggest problem associated with use of these materials for SOFC applications is the degradation in power with time. We found that the degradation rate of the LSCF cathode is closely related to the cell configuration and metallization as well as firing conditions, which influences the electrical conductivity and oxygen supply to the cathode.

This degradation problem can be remedied by the placement of a fully covered metallization layer on a lanthanum strontium cobalt iron oxide cathode layer within the SOFC. This metallization layer is preferably made from a noble metal and their alloys. In particular embodiments those containing silver and silver alloys such as silver-palladium have been deemed effective. Other materials, including ceramics such perovskites (similar to cathode materials), can also be utilized. Thickening of the cathode, the preparation of the device by utilizing a firing temperature in a designated range and the use of a pore former paste having designated characteristics and combinations of these features provide a device with enhanced capabilities.

In one embodiment, a cathode for use in a solid oxide fuel cell has a metallization layer covering more than 90 percent of the cathode. In some embodiments this cathode includes at least one lanthanum strontium cobalt iron oxide. This cathode may have a porosity of between 0-30 volume percent, thickness ranging from between 2~80 μm or both. Preferably the metallization layer has a thickness of between 10 and 25 percent of the thickness of the cathode. The cathode may be formed by heating a paste at a temperature between 950~1100° C. This paste may have a pore former having 0~30 vol % with respect to the volume of LSCF in the cathode forming paste.

In some embodiments of the invention, various microcracks are created in the cathode. These microcracks are typically formed during the heating process (firing) and can be influenced by a variety of factors. These include the thickness of cathode (the thicker, the more cracks), the firing temperature (the higher, the more in the range described in the patent), the pore former (the less, the more), the character of the cathode paste (the finer, the less), the tap density of powder (the higher, the more), etc.

Full coverage of a metallization layer assists to insure the current collection of the cathode with microcracks. However in some embodiments, overall full coverage has shown a better stability even without microcracks. Cathode porosity is continuous pores throughout the cathode layer. It is interconnected in a fine scale. The microcracks refer to discontinuity in the cathode layer. The cracks are usually perpendicular to the surface of the cathode, forming islands of cathode on the interlayer. The size of cathode islands (spacing between microcracks) is typically between 100~200 micron. However, in some circumstances these microcracks can be significantly sharper and sometimes be within tens of microns.

Various advantages and novel features of the present invention are described herein and will become further readily apparent to those skilled in this art from the following detailed description. In the preceding and following descriptions, only the preferred embodiment of the invention has been shown and described, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

DESCRIPTION OF THE PREFERRED EMBODIMENT

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, It should be understood, that there is no intention to limit the invention to the specific form disclosed, but, on the contrary, the invention is to cover all modifications, alternative constructions, and equivalents falling within the spirit and scope of the invention as defined in the claims.

The following description provides information related to one proposed cell configuration and preparation conditions for the stable LSCF cells. While this example is set forth, it is to be distinctly understood that the invention is not limited thereto, but maybe variously alternatively configured according to the needs and necessities of the user.

Figure 1:
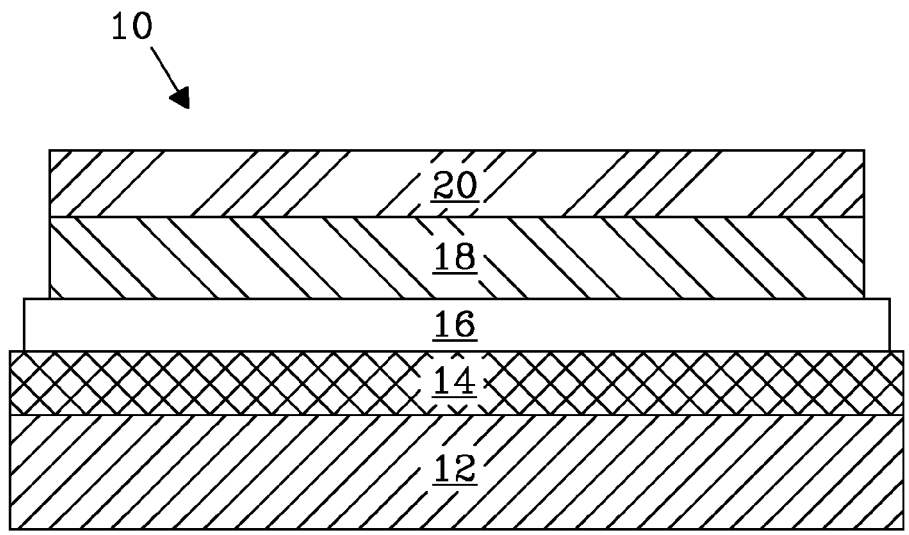
FIG. 1 shows the typical cell configuration of anode-supported LSCF-based SOFCs.

Referring now to FIGS. 1-7, a variety of views of the present invention and various performance characteristics thereof are shown. Referring first now to FIG. 1. FIG. 1 shows the cell configuration of an anode-supported LSCF-based SOFC. This SOFC fuel cell contains an anode 12, in this embodiment a Ni—YSZ anode, an electrolyte layer 14, an interlayer 16, a cathode 18, and a metallization layer 20 all stacked together. The interlayer 16 placed between the cathode 18 and the electrolyte prevents any reactions between them.

Cathode 18 is usually screen-printed on top of interlayer using a cathode paste that may or may not contain pore formers. After firing the cathode layer, the metallization layer (usually grid form) is also screen-printed on the cathode and then fired. This metallization layer is connected to the interconnects in order to supply the electrons to the cathode.

In this embodiment of the invention, the metallization layer 20 provides greater than 90 percent coverage over the cathode 18 and has a thickness ranging between 2~20 μm on an LCSF cathode 18 having a thickness generally between 2~80 μm. Preferably the metallization layer is made from a noble metal material such as Ag, however other metals, and other materials such as various ceramics may also be utilized in accordance to the specific needs and necessities of the user, The cathode is formed utilizing a firing temperature between 950~1100° C. and connected with a paste having a pore former having 0~30 vol % with respect to the volume of LSCF in the cathode forming paste.

Figure 2:
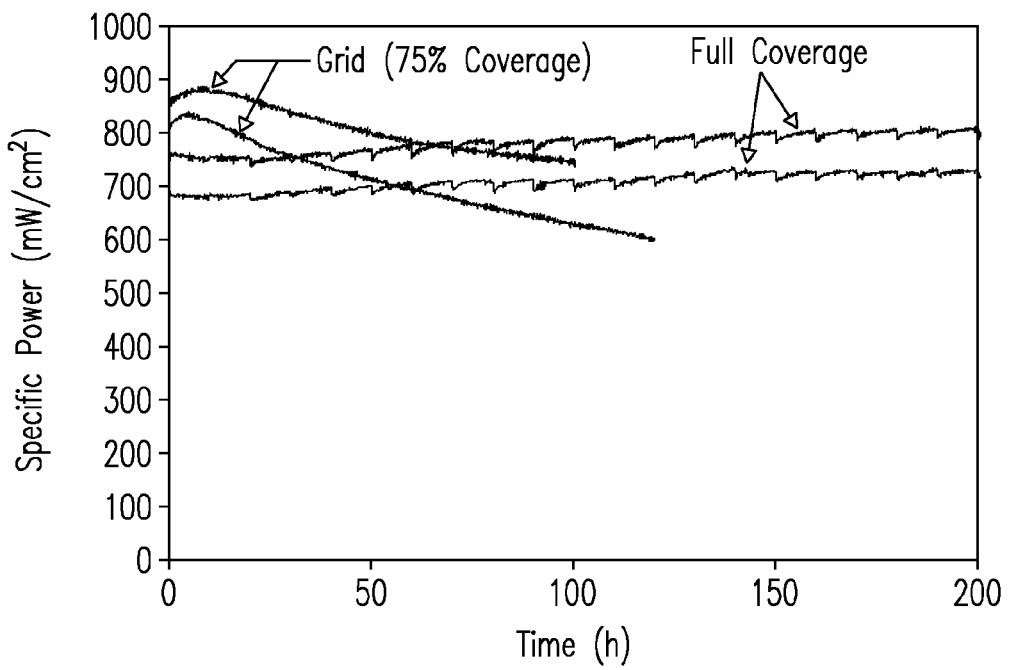
FIG. 2 shows a comparison of electrochemical performance with different metallization layers.
Figure 3:
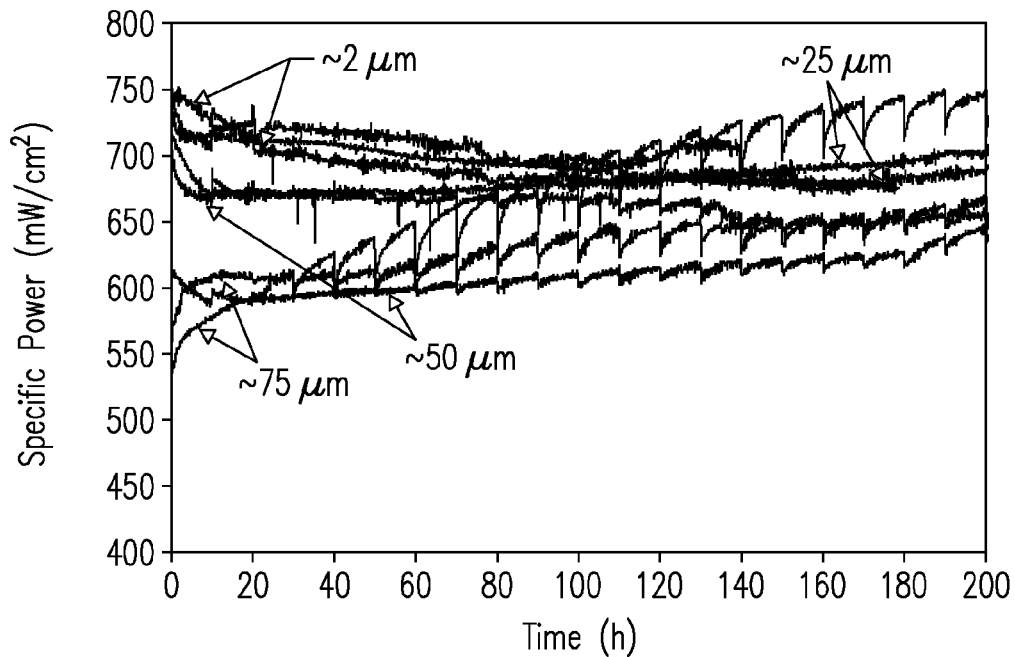
FIG. 3 shows the effects of cathode thickness on the stability of the LSCF cells with fully covered metallization.
Figure 4:
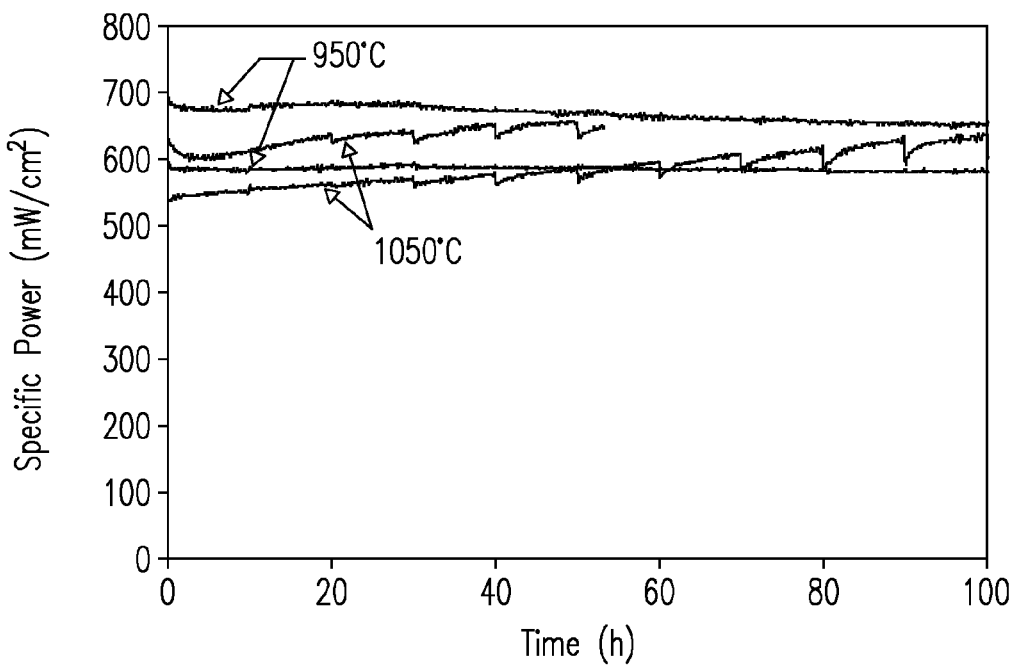
FIG. 4 shows the effect of firing temperature of the cathode layer.
Figure 5:
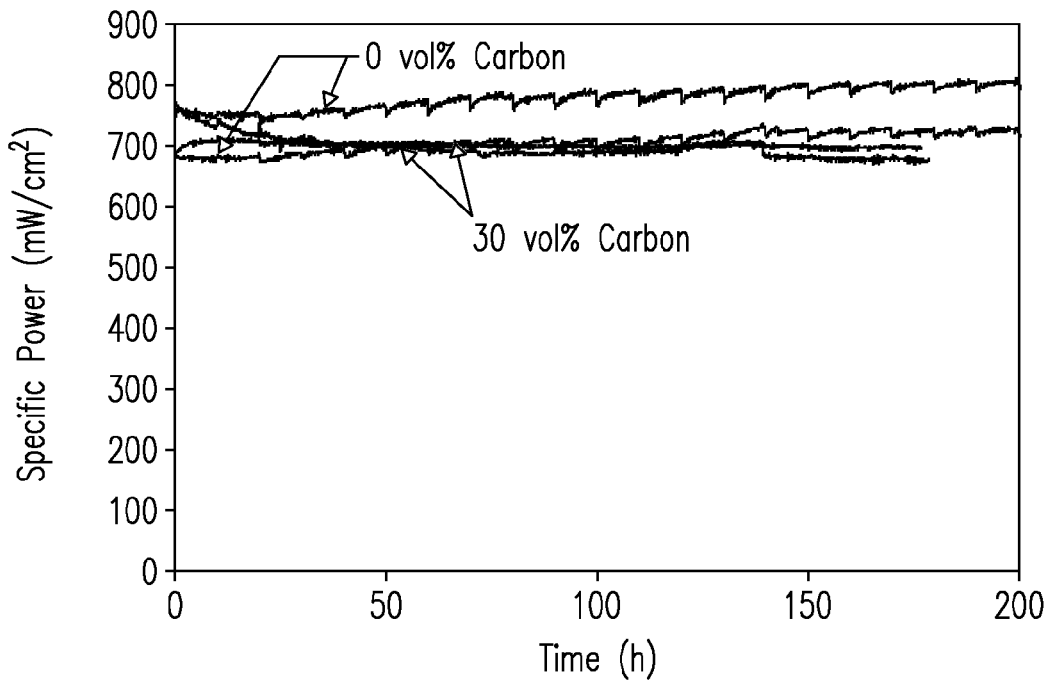
FIG. 5 shows the effect of varying the amount of pore former in the paste and the increasing the stability of fully covered LSCF cells.
Figure 6:
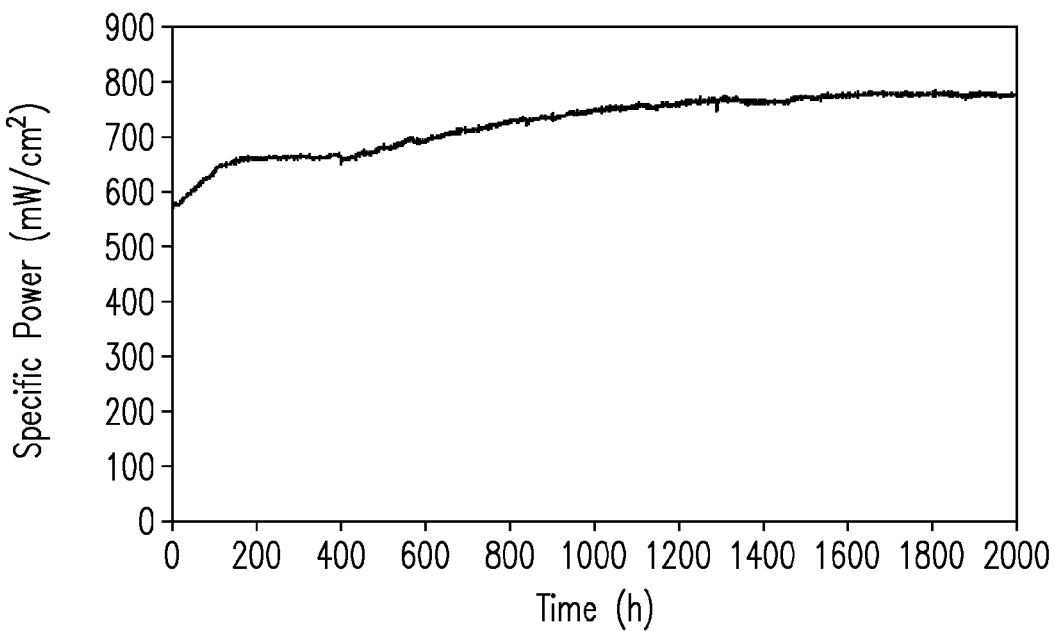
FIG. 6 shows the long term performance of a fully covered LSCF cell.

FIG. 2 shows a comparison of the electrochemical performance of the LSCF cells with different metallization layers. This figure shows that the stability of LSCF cells was greatly improved by using a fully covered metallization layer described above as compared to a cell with a grid. FIG. 3 shows the effects of cathode thickness on the stability of the LSCF cells with fully covered metallization. The thicker cathode revealed more stable performance, although the initial power decreased with thickness of the cathode. Other factors such as firing temperature of cathode layer (FIG. 4) and amount of pore former in the paste (FIG. 5) also influenced the stability of fully covered LSCF cells. FIG. 6 shows the long term performance of a fully covered LSCF cell, made according to the parameters set forth above. This cell revealed no degradation in power up to 2000 hrs of constant operation.

Figure 7A:
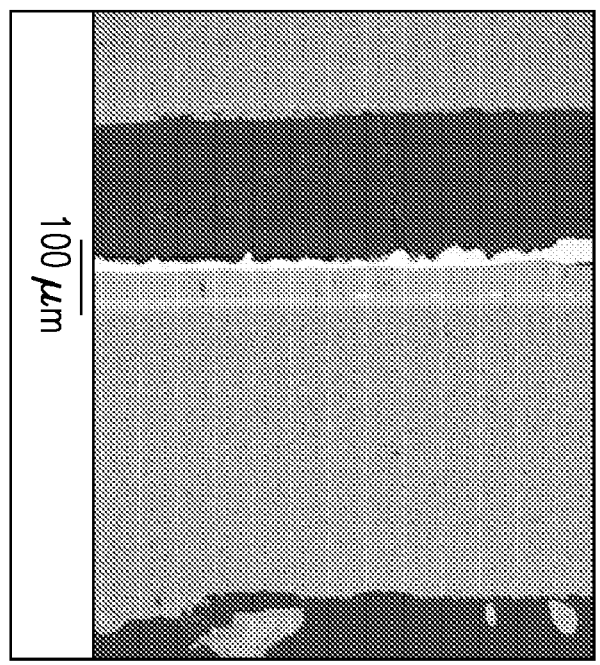
FIGS. 7a and 7b show micrographs of (a) a degraded cell and (b) a stable cell.
Figure 7B:
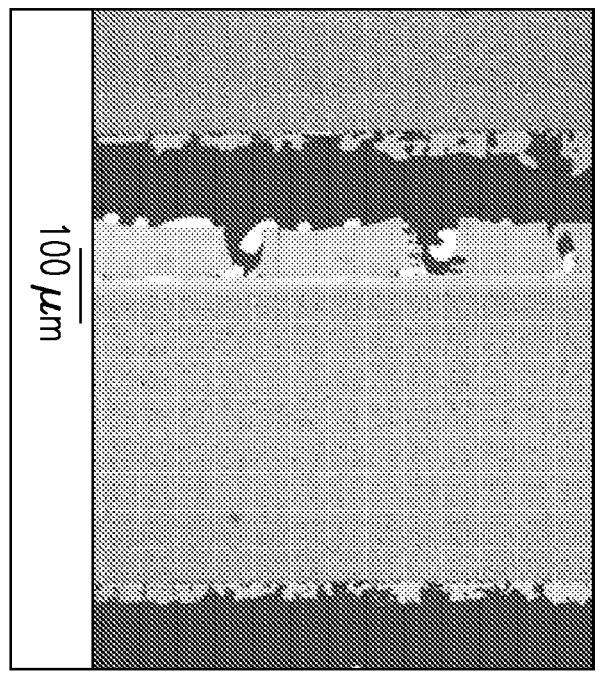

The degradation rate of the LSCF cathode has been determined to be closely related to the cell configuration and metallization as well as firing conditions, which influences the electrical conductivity and oxygen supply to the cathode. This embodiment optimized these variables to achieve stable performance of LSCF cathodes over 2000 hrs. FIG. 7 shows the SEM micrographs of typical microstructures of a degraded cell and a stable cell (refer to (a) and (b), respectively). The stable cell contains microcracks in a cathode layer with 100~200 μm spacing. These microcracks help to relieve the stress caused by the thermal expansion mismatch between a SDC interlayer and a LSCF cathode layer and improve the oxygen diffusion to the cathode. Various modifications to the cathode thickness, the cathode firing temperature, the use of pore former influence the development of this microstructure.

This configuration enables us to use the cathode for SOFC applications that require a long operating time without experiencing performance degradation, such auxiliary power supplies for automotive and residential power sources. While various preferred embodiments of the invention are shown and described, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A cathode for use in a solid oxide fuel cell comprising a cathode layer possessing thermal expansion mismatch with an interlayer, wherein the cathode layer contains microcracks forming cathode islands, and a metallization layer covering more than 90 percent of said cathode.

2. The cathode of claim 1 wherein the cathode layer comprises lanthanum strontium cobalt iron oxide.

3. The cathode of claim 2 wherein said cathode has a porosity of between 0-30 volume percent.

4. The cathode of claim 2 wherein said metallization layer comprises at least one material selected from the group consisting of noble metals and alloys thereof.

5. The cathode of claim 4 wherein said noble metal is Ag.

6. The cathode of claim 5 wherein said alloys are Ag alloys.

7. The cathode of claim 6 wherein said alloy is a Ag:Pd alloy.

8. The cathode of claim 2 wherein said cathode has a thickness ranging from between 2~80 μm.

9. The cathode of claim 2 wherein said metallization layer s a thickness of between 10 and 25 percent of the thickness of the cathode.

10. The cathode of claim 2 wherein said cathode is formed by heating of a paste at a temperature between 950~1100° C.

11. The cathode of claim 10 wherein the paste has a pore former having 0~30 vol % with respect to the volume of lanthanum strontium cobalt iron oxide in the cathode forming paste.

12. The cathode of claim 2 wherein the microcracks have 100~200 μm spacing.

13. The cathode of claim 2 wherein modification of fabrication parameters including thickness, firing temperature, and pore former allows formation of the microcracks.

14. The cathode of claim 2 wherein use of patterned screens or deposition of disconnected islands of cathode materials allows simulation of a microstructure of the microcracks.

* * * * *

UNITED STATES PATENT AND TRADEMARK OFFICE
CERTIFICATE OF CORRECTION

PATENT NO. : 8,182,965 B2  Page 1 of 1
APPLICATION NO. : 12/241277
DATED : May 22, 2012
INVENTOR(S) : Jin Yong Kim et al.

It is certified that error appears in the above-identified patent and that said Letters Patent is hereby corrected as shown below:

Col. 3, line 28: replace "20" with "12"

Col. 4, line 42: replace "s" with "has"

Signed and Sealed this
Twenty-fourth Day of July, 2012

David J. Kappos
*Director of the United States Patent and Trademark Office*